United States Patent
Cai et al.

(10) Patent No.: US 8,952,110 B2
(45) Date of Patent: *Feb. 10, 2015

(54) MOISTURE-CURABLE, AMINE-CATALYZED SULFUR-CONTAINING POLYMER COMPOSITIONS

(75) Inventors: Juexiao Cai, Stevenson Ranch, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/529,151

(22) Filed: Jun. 21, 2012

(65) Prior Publication Data

US 2013/0344251 A1    Dec. 26, 2013

(51) Int. Cl.
*C09D 181/02* (2006.01)
*B05D 3/00* (2006.01)

(52) U.S. Cl.
USPC ............................................ 525/535

(58) Field of Classification Search
USPC ............................................ 525/535
See application file for complete search history.

(56) References Cited

U.S. PATENT DOCUMENTS

| | | | |
|---|---|---|---|
| 3,344,161 A * | 9/1967 | Moedritzer et al. | 556/426 |
| 3,625,925 A * | 12/1971 | Oswald et al. | 568/66 |
| 3,940,374 A * | 2/1976 | Oswald et al. | 544/219 |
| 4,623,711 A | 11/1986 | Morris et al. | |
| 4,698,407 A * | 10/1987 | Nakagima et al. | 528/14 |
| 4,902,736 A | 2/1990 | Nonaka et al. | |
| 5,621,062 A * | 4/1997 | Castellucci et al. | 528/30 |
| 5,792,388 A * | 8/1998 | Heitz et al. | 252/514 |
| 5,859,275 A * | 1/1999 | Munzenberg et al. | 556/427 |
| 6,172,179 B1 | 1/2001 | Zook et al. | |
| 6,639,046 B1 * | 10/2003 | Van Dijk | 528/293 |
| 7,786,226 B2 | 8/2010 | Cosman | |
| 8,273,911 B2 * | 9/2012 | Mignani et al. | 556/478 |
| 2004/0091716 A1 * | 5/2004 | Van Den Berg et al. | 428/422.8 |
| 2006/0270796 A1 | 11/2006 | Sawant et al. | |
| 2007/0287810 A1 | 12/2007 | Rao et al. | |
| 2008/0119620 A1 * | 5/2008 | Kato et al. | 525/535 |
| 2009/0326167 A1 | 12/2009 | Sawant et al. | |
| 2010/0041839 A1 | 2/2010 | Anderson et al. | |
| 2010/0147463 A1 * | 6/2010 | Yamauchi et al. | 156/345.12 |

FOREIGN PATENT DOCUMENTS

| | | | |
|---|---|---|---|
| EP | 0295307 A1 | 12/1988 | |
| EP | 2420524 A1 | 2/2012 | |
| JP | 63145321 A * | 6/1988 | C08G 18/61 |
| WO | WO 2012/061498 A2 | 5/2012 | |

OTHER PUBLICATIONS

Mather et al., "Michael Addition Reactions in Macromolecular Design for Emerging Technologies" Prog. Polym. Sci., 2006, 31, pp. 487-531.

* cited by examiner

*Primary Examiner* — Mike M Dollinger

(74) *Attorney, Agent, or Firm* — Diane R. Meyers

(57) ABSTRACT

Disclosed are moisture-curable, amine-catalyzed compositions containing sulfur-containing polymers and blocked basic catalysts having extended pot life. The use of the moisture-curable, amine-catalyzed compositions in aerospace sealant applications is also disclosed.

21 Claims, No Drawings

MOISTURE-CURABLE, AMINE-CATALYZED SULFUR-CONTAINING POLYMER COMPOSITIONS

FIELD

The present disclosure relates to moisture-curable, amine-catalyzed sulfur-containing polymer compositions having extended pot life. The compositions are useful, for example, in aerospace sealant applications.

BACKGROUND

Sealants useful in aerospace and other applications are often pre-mixed frozen compositions (PMF) or two-part systems. In two-part systems, a first component contains a main polymer, such as a polysulfide polymer and/or a polythioether polymer, together with a number of additional materials. The first component does not contain a curing agent, which is included in the second component. The two components are manufactured and packaged separately, and mixed together immediately before use.

Unlike two-component systems, which require mixing the curing paste and the base before use, PMFs may be cured by external factors, such as temperature. For this reason, PMFs must be frozen at, for example, −40° F. to −80° F. in order to suppress or slow the curing reaction. When the PMFs are later brought to room temperature, the curing rate increases significantly. PMFs offer the convenience of being ready for use without mixing and therefore can be more cost- and time-effective than certain two-part systems. However, existing PMFs have limited pot lives, must be stored at very low temperatures such as −40° F. to −80° F., and require mixing of the base component and the activator followed by immediate freezing to slow the curing reaction. The requirement to store PMFs at low temperature prior to use can be inconvenient and/or expensive.

As a result, it is desirable to provide one-part aerospace sealant compositions that exhibit long pot life at ambient temperature and, when applied to a substrate and exposed to moisture (such as atmospheric moisture), cure to form a cured sealant having acceptable properties, including good shear strength. Moisture-curable sealant compositions in which the sulfur-containing polymer component is terminated with a silyl-functional group are disclosed in U.S. application Ser. No. 13/348,718. The silyl-functional group is removed or deblocked in the presence of moisture to expose a reactive thiol group that can be used with a variety of curing chemistries to provide a cured sealant. Other reactants and/or catalysts in these systems are unblocked. For example, in such systems, it can be desirable to use basic catalysts such as amine catalysts to accelerate the curing time of the reaction. However, during application, the unblocked basic catalyst can accelerate the reaction to cure the composition over time, thereby limiting the pot life or work life of the one-part sealant composition, where pot life refers to the time period the mixed composition remains workable for application at ambient temperature.

In sealants such as those described in U.S. Publication Nos. 2006/0270796, 2007/0287810, and 2009/0326167, a sulfur-containing polymer such as a polythioether is reacted with an epoxy curing agent in the presence of an amine catalyst to provide a cured product. Such systems typically cure in over two hours and, although exhibiting acceptable fuel resistance and thermal resistance for many applications, improved performance is desirable.

Michael addition curing chemistries are often used in acrylic-based polymer systems. Application of Michael addition curing chemistries to sulfur-containing polymers not only results in cured sealants with a faster cure rate and enhanced fuel resistance and thermal resistance, but can also provide a cured sealant with dramatically improved physical properties such as elongation. Sealant compositions employing Michael addition curing chemistries are disclosed in U.S. Application Publication No. 2013/0345371.

SUMMARY

Therefore, it is desirable to provide one-part aerospace compositions, such as sealants, that exhibit long pot life at ambient temperature and, when applied to a substrate and exposed to moisture (such as atmospheric moisture), cure to form a cured sealant having acceptable properties, including good shear strength. In the compositions provided by the present disclosure the basic catalyst as well as the sulfur-containing polymer component is protected with groups that are unblocked in the presence of moisture, thereby extending the pot life of the compositions. Additional performance enhancements are accessible through the use of Michael acceptor curing agents.

In a first aspect, moisture-curable compositions comprising (a) a trialkylsilane-terminated sulfur-containing polymer; (b) a curing agent; and (c) blocked basic catalyst, are disclosed.

In a second aspect, moisture-curable compositions comprising (a) a trialkylsilane-terminated sulfur-containing polymer; (b) a Michael acceptor curing agent; and (c) a basic catalyst, are disclosed.

In a third aspect, cured sealants comprising a moisture-curable composition provided by the present disclosure are disclosed.

In a fourth aspect, apertures sealed with a sealant comprising a moisture-curable composition provided by the present disclosure are disclosed.

In a fifth aspect, methods of sealing an aperture are disclosed comprising (a) applying a sealant comprising a moisture-curable composition provided by the present disclosure to at least one surface defining an aperture; (b) assembling the surfaces defining the aperture; and (c) curing the sealant to provide a sealed aperture.

DETAILED DESCRIPTION

Definitions

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("—") that is not between two letters or symbols is used to indicate a point of bonding for a substituent or between two atoms. For example, —CONH$_2$ is bonded to another chemical moiety through the carbon atom.

"Alkanediyl" refers to a diradical of a saturated, branched or straight-chain, acyclic hydrocarbon group, having, for example, from 1 to 18 carbon atoms ($C_{1-18}$), from 1-14 carbon atoms ($C_{1-14}$), from 1-6 carbon atoms ($C_{1-6}$), from 1 to 4 carbon atoms ($C_{1-4}$), or from 1 to 3 hydrocarbon atoms ($C_{1-3}$). In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methane-diyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, dodecane-1,12-diyl, and the like. It will be appreciated that a branched alkanediyl has at least three carbon atoms.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkoxy" refers to a —OR group where R is alkyl as defined herein. Examples of alkoxy groups include methoxy, ethoxy, n-propoxy, isopropoxy, and n-butoxy. In certain embodiments, the alkoxy group is $C_{1-8}$ alkoxy, $C_{1-6}$ alkoxy, $C_{1-4}$ alkoxy, and in certain embodiments, $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. In certain embodiments, the alkyl group is $C_{2-6}$ alkyl, $C_{2-4}$ alkyl, and in certain embodiments, $C_{2-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{2-6}$ alkyl, $C_{2-4}$ alkyl, and in certain embodiments, $C_{2-3}$ alkyl. It will be appreciated that a branched alkyl group has at least three carbon atoms.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon monoradical group. In certain embodiments, the cycloalkyl group is $C_{3-12}$ cycloalkyl, $C_{3-8}$ cycloalkyl, $C_{3-6}$ cycloalkyl, and in certain embodiments, $C_{5-6}$ cycloalkyl.

"Halogen" refers to a Cl, I, or Br atom. In certain embodiments, a halogen is Cl, in certain embodiments, I, and in certain embodiments, Br.

A "Michael acceptor" refers to an activated alkene, such as an alkenyl group proximate to an electron-withdrawing group such as a ketone, nitro, halo, nitrile, carbonyl, or nitro group. Michael acceptors are well known in the art. A "Michael acceptor group" refers to an activated alkenyl group and an electron-withdrawing group. In certain embodiments, a Michael acceptor group is selected from a vinyl ketone, a vinyl sulfone, a quinone, an enamine, a ketimine, an aldimine, an oxazolidine, and an acrylate. Other examples of Michael acceptors are disclosed in Mather et al., *Prog. Polym. Sci.* 2006, 31, 487-53, and include acrylate esters, acrylonitrile, acrylamides, maleimides, alkyl methacryltes, cyanoacrylates. Other Michael acceptors include vinyl ketones, α,β-unsaturated aldehydes, vinyl phosphonates, acrylonitrile, vinyl pyridines, certain azo compounds, β-keto acetylenes and acetylene esters. In certain embodiments, a Michael acceptor group is derived from a vinyl ketone and has the structure of the formula —S(O)$_2$—C(R)$_2$=CH$_2$, where each R is independently selected from hydrogen, fluorine, and $C_{1-3}$ alkyl. In certain embodiments, each R is hydrogen. In certain embodiments, a Michael acceptor or Michael acceptor group does not encompass acrylates. A "Michael acceptor compound" refers to a compound comprising at least one Michael acceptor. In certain embodiments, a Michael acceptor compound is divinyl sulfone, and a Michael acceptor group is vinylsulfonyl, e.g., —S(O)$_2$—CH$_2$=CH$_2$.

In certain embodiments, a Michael acceptor or Michael acceptor groups does not encompass acrylates and acrylics. As used herein, "polymer" refers to oligomers, homopolymers, and copolymers. Unless stated otherwise, molecular weights are number average molecular weights for polymeric materials indicated as "Mn" as determined, for example, by gel permeation chromatography using a polystyrene standard in an art-recognized manner.

"Substituted" refers to a group in which one or more hydrogen atoms are each independently replaced with the same or different substituent(s). In certain embodiments, the substituent is selected from halogen, —S(O)$_2$OH, —S(O)$_2$, —SH, —SR where R is $C_{1-6}$ alkyl, —COOH, —NO$_2$, —NR$_2$ where each R is independently selected from hydrogen and $C_{1-3}$ alkyl, —CN, =O, $C_{1-6}$ alkyl, —CF$_3$, —OH, phenyl, $C_{2-6}$ heteroalkyl, $C_{5-6}$ heteroaryl, $C_{1-6}$ alkoxy, and —COR where R is $C_{1-6}$ alkyl. In certain embodiments, the substituent is chosen from —OH, —NH$_2$, and $C_{1-3}$ alkyl.

Reference is now made to certain embodiments of compounds, polymers, compositions, and methods. The disclosed embodiments are not intended to be limiting of the claims. To the contrary, the claims are intended to cover all alternatives, modifications, and equivalents.

Compositions

Compositions provided by the present disclosure comprise (a) a trialkylsilane-terminated sulfur-containing polymer; (b) a curing agent; and (c) a basic catalyst.

Trialkylsilane-Terminated Sulfur-Containing Polymers

In certain embodiments, a sulfur-containing polymer is selected from a polythioether, a polysulfide, and a combination thereof. In certain embodiments the sulfur-containing polymer comprises a polythioether, and in certain embodiments, the sulfur-containing polymer comprises a polysulfide. The sulfur-containing polymer may comprise a mixture of different polythioethers and/or polysulfides, and the polythioethers and/or polysulfides may have the same or different functionality. In certain embodiments, the sulfur-containing polymer has an average functionality from 2 to 6, from 2 to 4, from 2 to 3, and in certain embodiments, from 2.05 to 2.8. For example, a sulfur-containing polymer can be selected from a difunctional sulfur-containing polymer, a trifunctional sulfur-containing polymer, and a combination thereof.

In certain embodiments provided by the present disclosure a sulfur-containing polymer comprises a polythioether. In certain embodiments, a polythioether comprises (a) a backbone comprising a structure having the Formula (1):

$$-R^1-[-S-(CH_2)_2-O-[-R^2-O-]_m-(CH_2)_2-S-R^1]_n- \qquad (1)$$

wherein (i) each R$^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a —[(—CH$_2$—)$_p$—X—]$_q$—(CH$_2$)$_r$— group, and a —[(—CH$_2$—)$_p$—X—]$_q$—(CH$_2$)$_r$— group in which at least one —CH$_2$— unit is substituted with a methyl group; (ii) each R$^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a —[(—CH$_2$—)$_p$—X—]$_q$—(CH$_2$)$_r$— group; (iii) each X is independently selected from —O—, —S—, and a —NR$^6$— group, in which R$^6$ is selected from hydrogen and a methyl group; (iv) m ranges from 0 to 50; (v) n is an integer ranging from 1 to 60; (vi) p is an integer ranging from 2 to 6; (vii) q is an integer ranging from 1 to 5; and (viii) r is an integer ranging from 2 to 10; and (b) at least two groups, per molecule, having Formula (2):

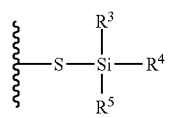

(2)

where R$^3$, R$^4$, and R$^5$ are independently selected from a $C_{1-6}$ n-alkyl group, a $C_{3-6}$ branched alkyl group, a substituted $C_{1-6}$ n-alkyl group, and a phenyl group. In certain embodiments, each of R$^3$, R$^4$, and R$^5$ is independently selected from a $C_{1-6}$ alkyl group, a phenyl group, and a $C_{1-6}$ chloroalkyl group. In certain embodiments of Formula (2), each of R$^3$, R$^4$, and R$^5$ is independently selected from $C_{1-6}$ alkyl, and in certain embodiments, $C_{1-3}$ alkyl. In certain embodiments of Formula (2), each of R$^3$, R$^4$, and R$^5$ is the same and is methyl, in certain embodiments, ethyl, and in certain embodiments, propyl. In certain embodiments of Formula (2), each of R$^3$, R$^4$, and R$^5$ is independently selected from ethyl, methyl, and propyl; and in certain embodiments, from ethyl and methyl. In certain embodiments of Formula (2), the substituent is selected from halogen, —OH, and —NH$_2$.

In certain embodiments where R$^1$ and/or R$^2$ is a heterocyclic group, the heterocyclic group is a 5-membered heterocyclic group or a 6-membered heterocyclic group containing one or more heteroatoms selected from —O—, —S—, and —NR— wherein R is selected from hydrogen and $C_{1-3}$ alkyl.

In certain embodiments, the trialkylsilane-terminated sulfur-containing polymer is selected from a trialkylsilane-terminated polythioether of Formula (3), a trialkylsilane-terminated polythioether adduct of Formula (3a), and a combination thereof:

$$R^6-S-R^1-[-S-(CH_2)_p-O-(R^2-O)_m-(CH_2)_2-S-R^1-]_n-S-R^6 \qquad (3)$$

$$\{R^6-S-R^1-[-S-(CH_2)_p-O-(R^2-O)_m-(CH_2)_2-S-R^1-]_n-S-V'-\}_zB \qquad (3a)$$

wherein:
each R$^1$ independently is selected from $C_{2-6}$ alkanediyl, $C_{6-8}$ cycloalkanediyl, $C_{6-10}$ alkanecycloalkanediyl, $C_{5-8}$ heterocycloalkanediyl, and —[(—CHR$^3$—)$_s$—X—]$_q$—(—CHR$^3$—)$_r$—; wherein:
  s is an integer from 2 to 6;
  q is an integer from 1 to 5;
  r is an integer from 2 to 10;
  each R$^3$ is independently selected from hydrogen and methyl; and
  each X is independently selected from —O—, —S—, and —NHR—, wherein R is selected from hydrogen and methyl;
each R$^2$ is independently selected from $C_{1-10}$ alkanediyl, $C_{6-8}$ cycloalkanediyl, $C_{6-14}$ alkanecycloalkanediyl, and —[(—CHR$^3$—)$_s$—X—]$_q$—(—CHR$^3$—)$_r$—, wherein s, q, r, R$^3$, and X are as defined above;
m is an integer from 0 to 50;
n is an integer from 1 to 60;
p is an integer from 2 to 6;
B represents a core of a z-valent, alkenyl-terminated polyfunctionalizing agent B(—V)$_z$ wherein:
  z is an integer from 3 to 6; and
  each —V is a group comprising a terminal alkenyl group; and
  each —V'— is derived from the reaction of —V with a thiol; and
each R$^6$ is independently a moiety comprising a terminal group of Formula (2), wherein R$^3$, R$^4$, and R$^5$ are each independently selected from a $C_{1-6}$ n-alkyl group, a $C_{3-6}$ branched alkyl group, a substituted $C_{1-6}$ n-alkyl group, and a phenyl group.

Various methods can be used to prepare polythioethers of Formula (1), Formula (3), and Formula (3a). In certain embodiments, a silyl-functional polythioether of Formula (1), Formula (3), and Formula (3a), may be prepared by reacting a thiol-functional polythioether with a halosilane. Examples of suitable thiol-functional polythioethers, and methods for their production, which are suitable for use in methods disclosed herein, are described in U.S. Pat. No. 6,172,179 at col. 2, line 29 to col. 4, line 22; col. 6, line 39 to col. 10, line 50; and col. 11, lines 65 to col. 12, line 22, the cited portions of which are incorporated herein by reference. Such thiol-functional polythioethers may be difunctional, that is, linear polymers having two end groups, or polyfunctional, that is, branched polymers have three or more end groups. Suitable thiol-functional polythioethers are commercially available, for example, as Permapol® P3.1E from PRC-DeSoto International Inc., Sylmar, Calif.

In certain embodiments, thiol-functional polythioethers include those of Formula (4):

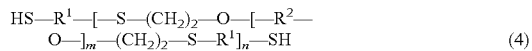

$$HS-R^1-[-S-(CH_2)_2-O-[-R^2-O-]_m-(CH_2)_2-S-R^1]_n-SH \quad (4)$$

wherein $R^1$, $R^2$, m, and n are defined as for Formula (1). In certain embodiments, $R^1$ in Formula (3a) is $-[(-CH_2-)_p-X-]_q-(CH_2)_r-$, where p is 2, X is $-O-$, q is 2, r is 2, $R^2$ is ethanediyl, m is 2, and n is 9.

Suitable thiol-functional polythioethers may be produced by reacting a divinyl ether or mixtures of divinyl ethers with an excess of dithiol or a mixtures of dithiols. For example, dithiols suitable for use in preparing such thiol-functional polythioethers include those having Formula (5):

$$HS-R^1-SH \quad (5)$$

where $R^1$ in Formula (5) denotes a $C_{2-10}$ n-alkanediyl group; a $C_{3-6}$ branched alkanediyl group, which may have one or more pendant groups which may be, for example, hydroxyl groups, alkyl groups, such as methyl or ethyl groups, and/or alkoxy groups; a $C_{6-8}$ cycloalkanediyl group; a $C_{6-10}$ alkanecycloalkanediyl group; a $-[(-CH_2-)_p-X-]_q-(CH_2)_r-$ group, or a $-[(-CH_2-)_p-X-]_q-(CH_2)_r-$ group in which at least one $-CH_2-$ unit is substituted with a methyl group, wherein p is an integer having a value ranging from 2 to 6, q is an integer having a value ranging from 1 to 5, r is an integer having a value ranging from 2 to 10, and X includes a heteroatom, such as $-O-$, $-S-$ or another bivalent heteroatom radical; a secondary or tertiary amine group, i.e., $-NR-$, where R is selected from hydrogen and methyl; or another substituted trivalent heteroatom. In certain embodiments, X is selected from $-O-$ and $-S-$, and thus $R^1$ in Formula (5) is $-[(-CH_2-)_p-O-]_q-(CH_2)_r-$ or $-[(-CH_2-)_p-S-]_q-(CH_2)_r-$. In certain embodiments, p and r are equal, such as where p and r are both two.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., $C_{1-6}$) alkyl group, a lower alkoxy group, and a hydroxyl group. Suitable alkyl pendant groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (5), $R^1$ is $-[(-CH_2-)_p-X-]_q-(CH_2)_r-$, wherein p is 2, r is 2, q is 1, and X is $-S-$); dimercaptodioxaoctane (DMDO) (in Formula (5), $R^1$ is $-[(-CH_2-)_p-X-]_q-(CH_2)_r-$, wherein p is 2, q is 2, r is 2, and X is $-O-$); and 1,5-dimercapto-3-oxapentane (in Formula (5), $R^1$ is $-[(-CH_2-)_p-X-]_q-(CH_2)_r-$, wherein p is 2, r is 2, q is 1, and X is $-O-$). It is also possible to use dithiols that include both heteroatoms in the carbon backbone and pendant alkyl groups, such as methyl groups. Such compounds include, for example, methyl-substituted DMDS, such as HS—$CH_2CH(CH_3)$—S—$CH_2CH_2$—SH, HS—$CH(CH_3)$$CH_2$—S—$CH_2CH_2$—SH and dimethyl substituted DMDS, such as HS—$CH_2CH(CH_3)$—S—$CHCH_3CH_2$—SH and HS—$CH(CH_3)CH_2$—S—$CH_2CH(CH_3)$—SH.

Two or more different dithiols of Formula (5) may be employed if desired.

Suitable divinyl ethers include, for example, divinyl ethers of Formula (6):

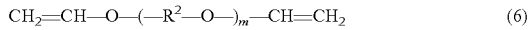

$$CH_2=CH-O-(-R^2-O-)_m-CH=CH_2 \quad (6)$$

where $R^2$ in Formula (6) is selected from a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and $-[(-CH_2-)_p-O-]_q-(-CH_2-)_r-$, where p is an integer ranging from 2 to 6, q is an integer ranging from 1 to 5, and r is an integer ranging from 2 to 10. In certain embodiments of a divinyl ether of Formula (6), $R^2$ is a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and in certain embodiments, $-[(-CH_2-)_p-O-]_q-(-CH_2-)_r-$.

Suitable divinyl ethers include, for example, compounds having at least one oxyalkanediyl group, such as from 1 to 4 oxyalkanediyl groups, i.e., compounds in which m in Formula (6) is an integer ranging from 1 to 4. In certain embodiments, m in Formula (6) is an integer ranging from 2 to 4. It is also possible to employ commercially available divinyl ether mixtures that are characterized by a non-integral average value for the number of oxyalkanediyl units per molecule. Thus, m in Formula (6) can also take on rational number values ranging from 0 to 10.0, such as from 1.0 to 10.0, from 1.0 to 4.0, or from 2.0 to 4.0.

Examples of suitable divinyl ethers include, for example, divinyl ether, ethylene glycol divinyl ether (EG-DVE) ($R^2$ in Formula (6) is ethanediyl and m is 1), butanediol divinyl ether (BD-DVE) ($R^2$ in Formula (6) is butanediyl and m is 1), hexanediol divinyl ether (HD-DVE) ($R^2$ in Formula (6) is hexanediyl and m is 1), diethylene glycol divinyl ether (DEG-DVE) ($R^2$ in Formula (6) is ethanediyl and m is 2), triethylene glycol divinyl ether ($R^2$ in Formula (6) is ethanediyl and m is 3), tetraethylene glycol divinyl ether ($R^2$ in Formula (6) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxyl groups, alkoxy groups, and amine groups.

In certain embodiments, divinyl ethers in which $R^2$ in Formula (6) is $C_{3-6}$ branched alkanediyl may be prepared by reacting a polyhydroxy compound with acetylene. Examples of divinyl ethers of this type include compounds in which $R^2$ in Formula (6) is an alkyl-substituted methanediyl group such as —$CH(CH_3)$— (for example "Pluriol® blends such as Pluriol®E-200 divinyl ether (BASF Corp., Parsippany, N.J.), for which $R^2$ in Formula (6) is ethanediyl and m is 3.8) or an alkyl-substituted ethanediyl (for example —$CH_2CH(CH_3)$— such as DPE polymeric blends including DPE-2 and DPE-3 (International Specialty Products, Wayne, N.J.)).

Other useful divinyl ethers include compounds in which $R^2$ in Formula (6) is polytetrahydrofuryl (poly-THF) or polyoxyalkanediyl, such as those having an average of about 3 monomer units.

Two or more types of polyvinyl ether monomers of Formula (6) may be used. Thus, in certain embodiments, two polythiols of Formula (5) and one polyvinyl ether monomer of Formula (6), one polythiol of Formula (5) and two polyvinyl ether monomers of Formula (6), two polythiols of Formula (5) and two polyvinyl ether monomers of Formula (6), and more than two compounds of one or both formulae, may be used to produce a variety of thiol-functional polythioethers.

In certain embodiments, a polyvinyl ether monomer comprises 20 to less than 50 mole percent of the reactants used to prepare a thiol-functional polythioether, and, in certain embodiments, 30 to less than 50 mole percent.

In certain embodiments provided by the present disclosure, relative amounts of dithiols and divinyl ethers are selected to yield terminal thiol groups. Thus, a dithiol having Formula (5) or a mixture of at least two different dithiols having Formula (5), are reacted with of a divinyl ether having Formula (6) or a mixture of at least two different divinyl ethers having Formula (6) in relative amounts such that the molar ratio of thiol groups to vinyl groups is greater than 1:1, such as 1.1 to 2.0:1.0.

The reaction between compounds of Formula (5) and Formula (6) may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The reaction may also be effected by irradiation with ultraviolet light either with or without a cationic photo-initiating moiety. Ionic catalysis methods, using either inorganic or organic bases, e.g., triethylamine, also yield useful materials.

Thiol-functional polythioethers suitable for use in preparing silyl-functional polythioethers provided by the present disclosure may be prepared by combining at least one compound of Formula (5) and at least one compound of Formula (6) followed by addition of an appropriate catalyst, and carrying out the reaction at a temperature from 30° C. to 120° C., such as 70° C. to 90° C., for a time from 2 to 24 hours, such as 2 to 6 hours.

As disclosed herein, thiol-functional polythioethers suitable for use in preparing polythioethers provided by the present disclosure may also be polyfunctional, i.e., may have an average functionality of greater than 2.0. Suitable polyfunctional thiol-functional polythioethers include, for example, those having the structure of Formula (7):

$$B(\text{-}A\text{-}SH)_z \tag{7}$$

wherein: (i) A denotes a structure of Formula (1), (ii) B denotes a z-valent residue of a polyfunctionalizing agent; and (iii) z has an average value of greater than 2.0, and, in certain embodiments, a value between 2 and 3, a value between 2 and 4, a value between 3 and 6, and in certain embodiments, is an integer of from 3 to 6.

Polyfunctionalizing agents suitable for use in preparing such polyfunctional thiol-functional polymers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Publication No. 2010/0010133 at paragraphs [0102]-[0105], the cited portion of which is incorporated herein by reference.

As a result, thiol-functional polythioethers suitable for use in embodiments provided by the present disclosure may have a wide range of average functionality. For example, trifunctionalizing agents may afford average functionalities from 2.05 to 3.0, such as from 2.1 to 2.8. Wider ranges of average functionality may be achieved by using tetrafunctional or higher functionality polyfunctionalizing agents. Functionality may also be affected by factors such as stoichiometry, as will be understood by those skilled in the art.

Thiol-functional polythioethers provided by the present disclosure having a functionality greater than 2.0 may be prepared in a manner similar to the difunctional thiol-functional polythioethers described herein. In certain embodiments, such polythioethers may be prepared by combining (i) one or more dithiols described herein, with (ii) one or more divinyl ethers described herein, and (iii) one or more polyfunctionalizing agents. The mixture may then be reacted, optionally in the presence of a suitable catalyst as described herein, to afford an average thiol-functional polythioether having a functionality greater than 2.0, for example, from about 2.1 to about 3.0, from about 2.2 to about 2.8, and in certain embodiments, from about 2.4 to about 2.6.

In certain embodiments, a sulfur-containing polymer comprises a polythioether selected from a polythioether of Formula (8), a polythioether of Formula (8a), and a combination thereof:

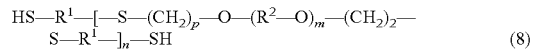

$$\text{HS}-\text{R}^1-[-\text{S}-(\text{CH}_2)_p-\text{O}-(\text{R}^2-\text{O})_m-(\text{CH}_2)_2-\text{S}-\text{R}^1-]_n-\text{SH} \tag{8}$$

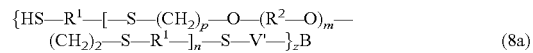

$$\{\text{HS}-\text{R}^1-[-\text{S}-(\text{CH}_2)_p-\text{O}-(\text{R}^2-\text{O})_m-(\text{CH}_2)_2-\text{S}-\text{R}^1-]_n-\text{S}-\text{V'}-\}_z\text{B} \tag{8a}$$

wherein:
each $R^1$ independently is selected from $C_{2\text{-}10}$ alkanediyl, $C_{6\text{-}8}$ cycloalkanediyl, $C_{6\text{-}10}$ alkanecycloalkanediyl, $C_{5\text{-}8}$ heterocycloalkanediyl, and $-[(-CHR^3-)_s-X-]_q-(-CHR^3-)_r-$, wherein:
  s is an integer from 2 to 6;
  q is an integer from 1 to 5;
  r is an integer from 2 to 10;
  each $R^3$ is independently selected from hydrogen and methyl; and
  each X is independently selected from $-O-$, $-S-$, and $-NHR-$, wherein R is selected from hydrogen and methyl;
each $R^2$ is independently selected from $C_{1\text{-}10}$ alkanediyl, $C_{6\text{-}8}$ cycloalkanediyl, $C_{6\text{-}14}$ alkanecycloalkanediyl, and $-[(-CHR^3-)_s-X-]_q-(-CHR^3-)_r-$, wherein s, q, r, $R^3$, and X are as defined above;
m is an integer from 0 to 50;
n is an integer from 1 to 60;
p is an integer from 2 to 6;
B represents a core of a z-valent, alkenyl-terminated polyfunctionalizing agent $B(-V)_z$ wherein:
  z is an integer from 3 to 6; and
  each $-V$ is a group comprising a terminal alkenyl group; and
  each $-V'-$ is derived from the reaction of $-V$ with a thiol.

In certain embodiments, $R^1$ in Formula (8) and in Formula (8a) is $-[(-CH_2-)_p-X-]_q-(CH_2)_r-$, where p is 2, X is $-O-$, q is 2, r is 2, $R^2$ is ethanediyl, m is 2, and n is 9.

In certain embodiments of Formula (8) and Formula (8a), $R^1$ is selected from $C_{2\text{-}6}$ alkanediyl and $-[-(CHR^3)_s-X-]_q-(CHR^3)_r-$.

In certain embodiments of Formula (8) and Formula (8a), $R^1$ is $-[-(CHR^3)_s-X-]_q-(CHR^3)_r-$, and in certain embodiments X is $-O-$ and in certain embodiments, X is $-S-$.

In certain embodiments of Formula (8) and Formula (8a), where $R^1$ is $-[-(CHR^3)_s-X-]_q-(CHR^3)_r-$, p is 2, r is 2, q is 1, and X is —S—; in certain embodiments, p is 2, q is 2, r is 2, and X is —O—; and in certain embodiments, p is 2, r is 2, q is 1, and X is —O—.

In certain embodiments of Formula (8) and Formula (8a), where $R^1$ is —[—$(CHR^3)_s$—X—$]_q$—$(CHR^3)_r$—, each $R^3$ is hydrogen, and in certain embodiments, at least one $R^3$ is methyl.

In certain embodiments of compounds of Formula (8) and Formula (8a), each $R^1$ is the same, and in certain embodiments, at least one $R^1$ is different.

In certain embodiments, thiol-functional polythioethers provided by the present disclosure are essentially free, or free, of sulfone, ester and/or disulfide linkages. As used herein, "essentially free of sulfone, ester, and/or disulfide linkages" means that less than 2 mole percent of the linkages in the thiol-functional polymer are sulfone, ester, and/or disulfide linkages. As a result, in certain embodiments, the resulting silyl-functional polythioethers are also essentially free, or free, of sulfone, ester, and/or disulfide linkages.

Silyl-functional polythioethers provided by the present disclosure may be prepared by reacting any of the thiol-functional polythioethers disclosed herein with a halosilane expressed by the general formula $(R^3)(R^4)R^5SiX$, wherein X represents a halogen atom such as Cl, Br, or I, and $R^3$, $R^4$, and $R^5$ are each independently selected from a $C_{1-6}$ n-alkyl group, a $C_{3-6}$ branched alkyl group, a substituted $C_{1-6}$ n-alkyl group, and a phenyl group. In certain embodiments of formula $(R^3)(R^4)R^5SiX$, each of $R^3$, $R^4$, and $R^5$ is the same and is methyl, in certain embodiments, ethyl, and in certain embodiments, propyl. In certain embodiments of formula $(R^3)(R^4)R^5SiX$, each of $R^3$, $R^4$, and $R^5$ is independently selected from ethyl, methyl, and propyl; and in certain embodiments, from ethyl and methyl. In certain embodiments of formula $(R^3)(R^4)R^5SiX$, X is Cl, in certain embodiments, Br, and in certain embodiments, X is I.

Examples of suitable halosilanes include trimethylchlorosilane, triethylchloro silane, tripropylchloro silane, tributylchloro silane, trimethylbromosilane, triethylbromosilane, triisopropylbromosilane, tributylbromosilane, trimethyliodosilane, triethyliodosilane, tripropyliodosilane, tributyliodosilane, trimethylfluorosilane, triethylfluorosilane, tripropylfluorosilane, tributylfluorosilane, dimethylphenylchlorosilane, chloromethyldimethylchlorosilane, and combinations of any of the foregoing.

In certain embodiments, a halosilane may be reacted with a thiol-functional polythioether and/or polysulfide in an amount sufficient to provide a silyl-functional polythioether and/or polysulfide comprising at least two groups having Formula (2). In certain embodiments, the molar ratio of halosilanes to thiol groups is at least 1:1, such as from 1.05 to 2.5:1, from 1.05 to 2.0:1, from 1.5 to 3.0:1, from 2 to 3.5:1, and in certain embodiments, from 2.5 to 3.5:1.

Polythioethers provided by the present disclosure may be prepared by combining one or more thiol-functional polythioethers and one or more halosilanes, optionally in the presence of a solvent, such as toluene, and/or an agent to neutralize the halogen acid reaction by product (such as a tertiary alkylamine, including those according to the formula $R_3N$, wherein each R may be the same or different and is a $C_{1-6}$ alkyl), and carrying out the reaction at a temperature from 25° C. to 120° C. for a time from 2 to 24 hours. In certain embodiments, the reaction may be carried out at a temperature from 70° C. to 90° C. for a time from 2 to 6 hours. The Examples herein are illustrative of suitable methods for carrying out this reaction.

As a result, certain embodiments provided by the present disclosure are directed to methods for making a silyl-functional polythioether. Certain methods comprise reacting a thiol-functional polythioether including thiol-functional polythioethers provided by the present disclosure, with a halosilane. In these methods, a thiol-functional polythioether comprises a structure having the Formula (1):

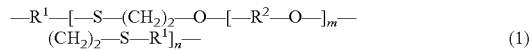

(1)

wherein (i) each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a —[(—$CH_2$—)$_p$—X—$]_q$—$(CH_2)_r$— group, and a —[(—$CH_2$—)$_p$—X—$]_q$—$(CH_2)_r$— group in which at least one —$CH_2$— unit is substituted with a methyl group; (ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a —[(—$CH_2$—)$_p$—X—$]_q$—$(CH_2)_r$— group; (iii) each X is independently selected from —O—, —S—, and a —$NR^6$— group, in which $R^6$ is selected from hydrogen and a methyl group; (iv) m ranges from 0 to 50; (v) n is an integer ranging from 1 to 60; (vi) p is an integer ranging from 2 to 6; (vii) q is an integer ranging from 1 to 5; and (viii) r is an integer ranging from 2 to 10.

In certain embodiments, a trialkylsilane-terminated polythioether comprises the reaction product of reactants comprising:

(a) a polythioether selected from a thiol-terminated polythioether of Formula (8), a thiol-terminated polythioether of Formula (8a), and a combination thereof:

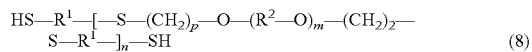

(8)

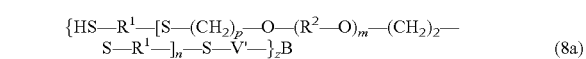

(8a)

wherein:

each $R^1$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and —[(—$CHR^3$—)$_s$—X—$]_q$—(—$CHR^3$—)$_r$—;

wherein:

s is an integer from 2 to 6;

q is an integer from 1 to 5;

r is an integer from 2 to 10;

each $R^3$ is independently selected from hydrogen and methyl; and each X is independently selected from —O—, —S—, and —NHR—, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and —[(—$CHR^3$—)$_s$—X—$]_q$—(—$CHR^3$—)$_r$—, wherein s, q, r, $R^3$, and X are as defined above;

m is an integer from 0 to 50;

n is an integer from 1 to 60;

p is an integer from 2 to 6;

B represents a core of a z-valent, alkenyl-terminated polyfunctionalizing agent $B(—V)_z$ wherein:

z is an integer from 3 to 6; and each —V is a group comprising a terminal alkenyl group; and each —V'— is derived from the reaction of —V with a thiol; and (b) a halosilane of Formula (9):

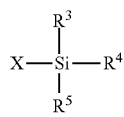

wherein:

X is halogen; and $R^3$, $R^4$, and $R^5$ are each independently selected from a $C_{1-6}$ n-alkyl group, a $C_{3-6}$ branched alkyl group, a substituted $C_{1-6}$ n-alkyl group, and a phenyl group.

In certain embodiments of compounds of Formula (8) and Formula (8a), z is 3 and the polyfunctionalizing agent is a trifunctionalizing agent.

In certain embodiments, a sulfur-containing polymer is thiol-terminated. Examples of thiol-functional polythioethers are disclosed, for example in U.S. Pat. No. 6,172,179. In certain embodiments, a thiol functional polythioether comprises Permapol® P3.1E, available from PRC-DeSoto International Inc., Sylmar, Calif.

In certain embodiments, a sulfur-containing polymer comprises a polysulfide, which may be reacted with a trialkylsilane to provide a trialkylsilane-terminated polysulfide. As used herein, a polysulfide refers to a polymer that contains one or more disulfide linkages, i.e., —[S—S]— linkages, in the polymer backbone and/or in pendant positions on the polymer chain. Often, the polysulfide polymer will have two or more sulfur-sulfur linkages. Suitable polysulfides are commercially available from Akzo Nobel under the name Thioplast®. Thioplast® products are available in a wide range of molecular weights ranging, for example, from less than 1,100 to over 8,000, with molecular weight being the average molecular weight in grams per mole. In some cases, the polysulfide has a number average molecular weight of 1,000 to 4,000. The crosslink density of these products also varies, depending on the amount of crosslinking agent used. The —SH content, i.e., thiol or mercaptan content, of these products can also vary. The mercaptan content and molecular weight of the polysulfide can affect the cure speed of the polymer, with cure speed increasing with molecular weight.

In certain embodiments provided by the present disclosure, in addition to or in lieu of, a polysulfide, a composition comprises: (a) from 90 mole percent to 25 mole percent of mercaptan terminated disulfide polymer of the formula HS(RSS)$_m$R—SH; and (b) from 10 mole percent to 75 mole percent of diethyl formal mercaptan terminated polysulfide polymer of the formula HS(RSS)$_n$R—SH, wherein R is —C$_2$H$_4$—O—CH$_2$—O—C$_2$H$_4$—; R is a divalent member selected from alkyl of from 2 to 12 carbon atoms, alkyl thioether of from 4 to 20 carbon atoms, alkyl ether of from 4 to 20 carbon atoms and one oxygen atom, alkyl ether of from 4 to 20 carbon atoms and from 2 to 4 oxygen atoms each of which is separated from the other by at least 2 carbon atoms, alicyclic of from 6 to 12 carbon atoms, and aromatic lower alkyl; and the value of m and n is such that the diethyl formal mercaptan terminated polysulfide polymer and the mercaptan terminated disulfide polymer have an average molecular weight of from 1,000 Daltons to 4,000 Daltons, such as 1,000 Daltons to 2,500 Daltons. Such polymeric mixtures are described in U.S. Pat. No. 4,623,711 at col. 4, line 18 to col. 8, line 35, the cited portion of which being incorporated herein by reference. In some cases, R in the above formula is —CH$_2$—CH$_2$—; —C$_2$H$_4$—O—C$_2$H$_4$—; —C$_2$H$_4$—S—C$_2$H$_4$—; —C$_2$H$_4$—O—C$_2$H$_4$—O—C$_2$H$_4$—; or —CH$_2$—C$_6$H$_4$—CH$_2$—.

Trialkylsilane-terminated polysulfides and their preparation are disclosed, for example, in U.S. Pat. No. 4,902,736. In certain embodiments, a polysulfide comprises a thiol-terminated polysulfide such as those commercially available from Akzo Nobel under the name Thioplast® and from Toray under the name Thiokol®-LP.

The terminal thiol groups of a thiol-terminated polysulfide may be converted to trialkylsilane groups by reacting, for example, the thiol-terminated polysulfide with a halo silane, such as a halosilane of Formula (9) in the presence of a basic catalyst including an amine catalyst such as triethylamine. Examples of suitable halogenosilanes include trimethylchlorosilane, trimethylbromosilane, trimethyliodosilane, dimethylphenylchlorosilane, and chloromethyldimethylchlorosilane. Thiol groups may also be converted to trialkylsilane groups by reacting a thiol-terminated polysulfide with a suitable acetoamide or urea such as N,O-bis(trimethylsilyl)acetoamide or N,N'-bis(trimethylsilyl)urea. Another method includes reacting a thiol-terminated polysulfide with a silazane such as hexamethyldisilazane in the presence of an appropriate catalyst such as imidazole or saccharhin.

Curing Agent

Curing agents useful in compositions provided by the present disclosure include those that are reactive with the unblocked terminal groups of the sulfur-containing polymer. In certain embodiments, the reactive groups of the unblocked sulfur-containing polymer are thiol groups, and the curing agents can be epoxy curing agents and/or Michael acceptors. In certain embodiments, a curing agent is selected from a polyepoxide, a compound having at least two terminal Michael acceptor groups, and a combination thereof.

In certain embodiments, a curing agent comprises an epoxy curing agent such as a polyepoxide, e.g., an epoxide having two or more epoxy groups. Epoxy curing agents useful in compositions provided by the present disclosure include, for example, polyepoxide resins such as hydantoin diepoxide, diglycidyl ether of bisphenol-A, diglycidyl ether of bisphenol-F, Novolac type epoxides, and any of the epoxidized unsaturated resins. In certain embodiments, a curing agent is a Michael acceptor curing agent. Michael acceptor curing agents include, for example, compounds having at least two terminal Michael acceptor groups.

In certain embodiments, a Michael acceptor curing agent comprises at least two Michael acceptor groups such as, for example, vinyl ketones, vinyl sulfones, quinones, vinyl sulfonics, enamines, ketimines, aldimines, and oxazolidine.

In certain embodiments, a Michael acceptor comprises a vinyl sulfone including a mixture of different types of vinyl sulfones and/or having different functionalities of Michael acceptor groups. In embodiments in which the Michael acceptor comprises a mixture of vinyl sulfones having different functionalities the average functionality of the mixture of vinyl sulfones can be from 2 to 6, and in certain embodiments, from 2 to 3.

In certain embodiments, a Michael acceptor group is selected from a vinyl ketone, a vinyl sulfone, a quinone, an enamine, a ketimine, an aldimine, and oxazolidine. In certain embodiments, a Michael acceptor group is a vinyl ketone, and in certain embodiments, a vinyl sulfone such as divinyl sulfone. In certain embodiments, a Michael acceptor is divinyl sulfone.

Michael acceptor groups are well known in the art. In certain embodiments, a Michael acceptor group comprises an activated alkene, such as an alkenyl group proximate to an electron-withdrawing group such as an enone, nitro, halo, nitrile, carbonyl, or nitro group. In certain embodiments, a Michael acceptor group is selected from a vinyl ketone, a vinyl sulfone, a quinone, an enamine, a ketimine an aldimine, and an oxazolidine. In certain embodiments, each of the Michael acceptor groups may be the same and in certain embodiments, at least some of the Michael acceptor groups are different.

In certain embodiments, compositions provided by the present disclosure comprise a sulfur-containing polymer and a Michael acceptor curing agent. A sulfur-containing polymer may be a polythioether and/or combination of polythioethers having terminal groups reactive with the Michael acceptor, or a polysulfide or combination of polysulfides having terminal groups reactive with the Michael acceptor. In such embodiments, a Michael acceptor will be polyfunctional and have Michael acceptor groups reactive with the terminal groups of the sulfur-containing polymer.

A polyfunctional Michael acceptor may have an average Michael acceptor functionality from 2 to 6, from 2 to 4, from 2 to 3, and in certain embodiments, from 2.05 to 2.5. In certain embodiments, a polyfunctional Michael acceptor is difunctional, such as, divinyl ketone and divinyl sulfone. A Michael acceptor having a functionality greater than two may be prepared by reacting a compound having a Michael acceptor group and a group reactive with terminal groups of a polyfunctionalizing agent such as those disclosed herein, with the polyfunctionalizing agent using appropriate reaction conditions.

In certain embodiments where a Michael acceptor is used as a curing agent the molecular weight of the Michael acceptor is less than 600 Daltons, less than 400 Daltons, and in certain embodiments, less than 200 Daltons.

In certain embodiments, a Michael acceptor group is derived from a vinyl ketone and has the structure of Formula (10):

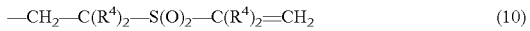

$$—CH_2—C(R^4)_2—S(O)_2—C(R^4)_2=CH_2 \qquad (10)$$

wherein each $R^4$ is independently selected from hydrogen, fluorine, and $C_{1-3}$ alkyl. In certain embodiments, each $R^4$ is hydrogen.

In certain embodiments, a Michael acceptor curing agent comprises a Michael acceptor adduct. In certain embodiments, a Michael acceptor adduct comprises a sulfur-containing polymer, such as a sulfur-containing polymer disclosed herein, having terminal Michael acceptor groups.

In certain embodiments where the sulfur-containing adduct comprises a polythioether adduct, the polythioether adduct is selected from a polythioether adduct of Formula (11), a polythioether adduct of Formula (11a), and a combination thereof:

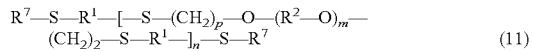

$$R^7—S—R^1—[—S—(CH_2)_p—O—(R^2—O)_m—(CH_2)_2—S—R^1—]_n—S—R^7 \qquad (11)$$

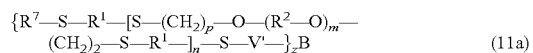

$$\{R^7—S—R^1—[S—(CH_2)_p—O—(R^2—O)_m—(CH_2)_2—S—R^1—]_n—S—V'—\}_zB \qquad (11a)$$

wherein:
each $R^1$ independently is selected from $C_{2-10}$ alkanediyl, substituted $C_{2-10}$ alkanediyl wherein the substituent groups are selected from $C_{1-3}$ alkyl, $C_{1-3}$ alkoxy, $C_{6-8}$ cycloalkyl, $C_{6-10}$ alkanecycloalkyl, and $C_{5-8}$ heterocycloalkyl, and $—[(—CHR^3—)_s—X—]_q—(—CHR^3—)_r—$, wherein:
s is an integer from 2 to 6;
q is an integer from 1 to 5;

r is an integer from 2 to 10;
each $R^3$ is independently selected from hydrogen and methyl; and
each X is independently selected from —O—, —S—, and —NHR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined above;
m is an integer from 0 to 50;
n is an integer from 1 to 60;
p is an integer from 2 to 6;
B represents a core of a z-valent, alkenyl-terminated polyfunctionalizing agent B(—V)$_z$ wherein:
z is an integer from 3 to 6; and
each —V is a group comprising a terminal vinyl group; and
each —V'— is derived from the reaction of —V with a thiol; and
each $R^7$ is independently a moiety comprising a terminal Michael acceptor group.

In certain embodiments of compounds of Formula (11) and Formula (11a), each $R^6$ is independently selected from a vinyl ketone, a vinyl sulfone, a quinone, an enamine, a ketimine and an aldimine, and an oxazolidine. In certain embodiments, each of the Michael acceptor groups may be the same and in certain embodiments, at least one of the Michael acceptor groups are different.

In certain embodiments of compounds of Formula (11) and Formula (11a), each $R^6$ is independently derived from a vinyl ketone and has the structure of Formula (10):

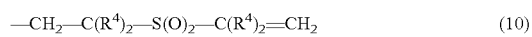

$$—CH_2—C(R^4)_2—S(O)_2—C(R^4)_2=CH_2 \qquad (10)$$

where each $R^4$ is independently selected from hydrogen, fluorine, and $C_{1-3}$ alkyl. In certain embodiments of compounds of Formula (11) and Formula (11a), each $R^4$ in a moiety of Formula (10) is hydrogen.

In certain embodiments, a Michael acceptor adduct comprises a Michael acceptor adduct of Permapol® 3.1E (PRC-DeSoto International, Inc.).

Sulfur-containing polymer adducts comprising terminal Michael acceptor groups are disclosed in U.S. Application Publication No. 2013/0345371, which is incorporated by reference herein.

In certain embodiments, a curing agent is an adduct comprising a sulfur-containing polymer and two or more groups that are reactive with the unblocked groups of the sulfur-containing polymer. In certain embodiments, the adduct curing agent may itself contain blocked reactive groups.

Epoxy and Michael Acceptor

In certain embodiments, a curing agent comprises a combination of a Michael acceptor curing agents and polyepoxies, including any of those disclosed herein.

In certain embodiments, a composition contains 90% to 150% of the stoichiometric amount, such as 95% to 125% of the stoichiometric amount, of the curing agent(s).

Blocked Catalyst

In certain embodiments, compositions provided by the present disclosure comprise a blocked basic catalyst that can be unblocked in the presence of moisture and that is appropriate for use in reactions between a curing agent provided by the present disclosure and the unblocked groups of a sulfur-containing polymer provided by the present disclosure. In certain embodiments, the catalyst accelerates the reaction between a polyepoxy and/or Michael acceptor curing agent and reactive thiol groups of a sulfur-containing polymer. In certain embodiments, a catalyst is a blocked basic catalyst, such as a blocked amine catalyst. Examples of blocked amine catalysts include ketimine, enamine, oxazolidine, aldimine, and imidazolidine.

Specific Embodiment

In certain embodiments, a one-part composition suitable for use as an aerospace sealant comprises a trialkylsilane-terminated polythioether, a Michael acceptor curing agent, and a blocked amine catalyst. In certain embodiments, a one-part composition suitable for use as an aerospace sealant comprises a trialkylsilane-terminated polythioether, an unblocked epoxy curing agent, and a blocked amine catalyst.

In certain embodiments, a trialkylsilane-terminated sulfur-containing polymer is selected from a trialkylsilane-terminated polythioether of Formula (3), a trialkylsilane-terminated polythioether adduct of Formula (3a), and a combination thereof; a curing agent is divinyl sulfone; and the blocked amine catalyst is ketimine.

Compositions provided by the present disclosure are curable upon exposure to ambient air. Upon exposure to humidity in the air, the silyl group of the trialkylsilane terminated sulfur-containing polymer hydrolyzes and is thereby converted to, for example, a thiol group. The resultant thiol groups may be cured in the presence of a curing agent. Also, upon exposure to humidity in the air, the blocking group of the blocked basic catalyst is unblocked to provide an active amine catalyst. The active amine accelerates the reaction of the unblocked sulfur-containing polymer and the unblocked curing agent.

Michael Acceptor Curing Agent and Catalyst

In certain embodiments, a moisture-curable composition comprises (a) a trialkylsilane-terminated sulfur-containing polymer; (b) a Michael acceptor curing agent; and (c) a basic catalyst. Such compositions may comprise any of the trialkylsilane-terminated sulfur-containing polymers provided by the present disclosure and any of the Michael acceptor curing agents disclosed herein. In such embodiments, a basic catalyst may be an unblocked basic catalyst. Examples of suitable unblocked catalysts include amine catalysts, organometallic catalysts, and acid catalysts. Examples of suitable amine catalysts include, for example, triethylenediame (1,4-diazabicyclo[2.2.2]octane, DABCO), dimethylcyclohexylamine (DMCHA), dimethylethanolamine (DMEA), bis-(2-dimethylaminoethyl)ether, N-ethylmorpholine, triethylamine, 1,8-diazabicyclo[5.4.0]undecene-7 (DBU), pentamethyldiethylenetriamine (PMDETA), benzyldimethylamine (BDMA), N,N,N'-trimethyl-N'-hydroxyethyl-bis(aminoethyl)ether, and N'-(3-(dimethylamino)propyl)-N,N-dimethyl-1,3-propanediamine. Examples of suitable organometallic catalysts include, for example, mercury, lead, tin (dibutyltin dilaurate, dibutyltin oxide, dioctyltin mercaptide), and bismuth (bismuth octanoate). In certain embodiments, compositions provided by the present disclosure comprise a carboxylic acid catalyst such as, for example, formic acid (methanoic acid), acetic acid (ethanoic acid), propionic acid (propanoic acid), butyric acid (butanoic acid), valeric acid (pentanoic acid), caproic acid (hexanoic acid), enanthic acid (heptanoic acid), caprylic acid (heptanoic acid), pelargonic acid (nonanoic acid), capric acid (decanoic acid), or a combination of any of the foregoing. In certain embodiments, compositions provided by the present disclosure comprise pelargonic acid.

Sealants

Silyl-functional sulfur containing polymers provided by the present disclosure are useful in compositions, such as coatings and sealant compositions, including those that may be employed as aerospace sealants and as linings for fuel tanks. As a result, certain embodiments provided by the present disclosure are directed to compositions, such as one-part compositions, that include a silyl-functional polythioether, a curing agent, and a basic catalyst. In these one-part compositions, a silyl-functional polythioether and curing agent, optionally in combination with other composition components, are combined and packaged in a single, moisture-sealed container to substantially prevent curing prior to use. The compositions are stable under conditions substantially free of moisture and at ambient temperatures. As used herein, "free of moisture" and "substantially free of moisture" means that, although a composition may contain some moisture, the amount of moisture is not sufficient to substantially effect curing of the composition. When a composition is exposed to sufficient moisture, curing of the composition is promoted to form a sealant useful in many applications, including, for example, aerospace and similar applications.

In certain embodiments, such compositions may comprise other silyl-functional polymers in addition to the previously described silyl-functional polythioethers. For example, in certain embodiments, compositions provided by the present disclosure may comprise a silyl-functional polysulfide, such as, for example, a silyl-functional polysulfide derived from a polysulfide of the type described in U.S. Pat. No. 7,786,226 at col. 1, line 57 to col. 2, line 18, the cited portion of which is incorporated herein by reference. In certain embodiments, such compositions may further comprise a silyl-functional polymer derived from a mercaptan-functional polysulfide polymer of the formula HS(RSS)$_n$RSH, wherein R is —C$_2$H$_4$—O—CH$_2$—O—C$_2$H$_4$— and n is such that the molecular weight of the polymer is from 1,000 to 4,000, such as 1,000 to 2,500, such as is described in U.S. Pat. No. 4,623,711 at col. 4, line 18 to col. 8, line 35, the cited portion of which is incorporated herein by reference. Such thiol-functional polymers may be made silyl-functional by reaction with a halosilane, as described herein with respect to silyl-functional polythioethers.

In certain embodiments, silyl-functional sulfur-containing polymer provided by the present disclosure may be present in a composition in an amount from 30 wt % to 90 wt %, such as from 40 wt % to 80 wt %, or, in certain embodiments, from 45 wt % to 75 wt %, based on the total weight of all non-volatile components of the composition.

In certain embodiments, a curing agent comprises from about 1 wt % to about 10 Wt % of the composition, form about 2 wt % to about 8 wt %, from about 2 wt % to about 6 wt %, and in certain embodiments, from about 2 wt % to 4 wt % of the composition, where wt % is based on the total dry solids weight of the composition.

In certain embodiments, compositions may comprise one or more additional adhesion promoters. A one or more additional adhesion promoter may be present in amount from 0.1 wt % to 15 wt % of a composition, less than 5 wt %, less than 2 wt %, and in certain embodiments, less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art. Compositions may comprise a sulfur-containing adhesion promoter as disclosed in U.S. Application Publication No. 2013/0344287, which is incorporated by reference herein.

Compositions provided by the present disclosure may comprise one or more different types of filler. Suitable fillers include those commonly known in the art, including inorganic fillers, such as carbon black and calcium carbonate (CaCO₃), and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

In certain embodiments, compositions provided by the present disclosure comprise a filler. Examples of suitable fillers include carbon black, calcium carbonate, silica, polymer powders, and a combination of any of the foregoing. In certain embodiments, one or more fillers are present in a composition in an amount ranging from 5% to 60% by weight, from 10% to 60% by weight, from 20% to 60% by weight, and in certain embodiments, from 30% to 60% by weight, based on the total weight of the composition.

In certain embodiments, compositions provided by the present disclosure include low density filler particles. As used herein, low density, when used with reference to such particles means that the particles have a specific gravity of no more than 0.7, in certain embodiments no more than 0.25, and in certain embodiments, no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 to 100 microns and a specific gravity of 0.25 (Eccospheres®). Other examples include alumina/silica microspheres having particle sizes in the range of 5 to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). In certain embodiments, compositions provided by the present disclosure include lightweight filler particles comprising an exterior surface coated with a thin coating, such as those described in U.S. Publication No. 2010/0041839 at paragraphs [0016]-[0052], the cited portion of which is incorporated herein by reference.

In certain embodiments, a low density filler comprises less than 2 wt % of a composition, less than 1.5 wt %, less than 1.0 wt %, less than 0.8 wt %, less than 0.75 wt % less than 0.7 wt % and in certain embodiments, less than 0.5 wt % of a composition, where wt % is based on the total dry solids weight of the composition.

In certain embodiments, compositions provided by the present disclosure comprise at least one filler that is effective in reducing the specific gravity of the composition. In certain embodiments, the specific gravity of a composition is from 0.8 to 1, 0.7 to 0.9, from 0.75 to 0.85, and in certain embodiments, is 0.8. In certain embodiments, the specific gravity of a composition is less than about 0.9, less than about 0.8, less than about 0.75, less than about 0.7, less than about 0.65, less than about 0.6, and in certain embodiments, less than about 0.55.

A composition may also include any number of additives as desired. Examples of suitable additives include plasticizers, pigments, surfactants, adhesion promoters, thixotropic agents, fire retardants, masking agents, and accelerators (such as amines, including 1,4-diaza-bicyclo[2.2.2] octane), and combinations of any of the foregoing. When used, the additives may be present in a composition in an amount ranging, for example, from about 0% to 60% by weight. In certain embodiments, additives may be present in a composition in an amount ranging from about 25% to 60% by weight.

In certain embodiments, compositions provided by the present disclosure comprise a basic oxide, which may act as dehydrating agents, thereby preventing premature cure of the composition, but when cure is desired, the base that is generated acts as a curing catalyst in the compositions described herein. As a result, it is possible to use less cure accelerator, such as an amine, in compositions provided by the present disclosure, which may further extend the pot life of the compositions. Examples of basic oxides that are suitable for use in compositions provided by the present disclosure include calcium oxide, magnesium oxide, barium oxide, or a combination of any of the foregoing. In certain embodiments of compositions provided by the present disclosure, a basic oxide is present in an amount of 0.1 to 10 percent by weight, such as 1 to 10, or, in certain embodiments, 5 to 10 percent by weight, based on the total weight of the composition.

Uses

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process known to those of ordinary skill in the art.

In certain embodiments, compositions provided by the present disclosure provide a cured sealant having a lap shear strength of >200 psi, such as at least 220 psi, or, in certain embodiments, at least 250 psi, when measured according to Paragraph 7.8 of AS 5127/1.

In certain embodiments, for storage and transportation, the composition components, including a silyl-functional polythioether and curing agent, are combined in a container and sealed from moisture. While sealed from moisture in the container, the composition is stable and remains substantially uncured for an extended time period.

Compositions including sealants provided by the present disclosure may be provided as one-part compositions, meaning that the compositions may be used for their intended purpose without adding additional materials. Compositions provided by the present disclosure exhibited an extended pot life. For example, the components including a silyl-terminated sulfur-containing polymer, unblocked curing agent, blocked basic catalyst, and optional additives, may be mixed and maintained inside of a container without continuously exposing the mixed components to ambient moisture. In certain embodiments, the pot life or work life is at least about 24 hours, at least about 36 hours, at least about 48 hours, and in certain embodiments, more than 48 hours. In certain embodiments, the pot life or work life is at least about 1 week, at least about 2 weeks, at least about 3 weeks, and in certain embodiments, more than 3 weeks.

When exposed to the moisture in air, the components of compositions provided by the present disclosure react to provide cured compositions, including sealant compositions. In certain embodiments, a composition cures to a tack-free cure in less than about 30 minutes at a temperature of about 25° C. or higher. The time to form a viable seal using moisture-curable compositions provide by the present disclosure can depend on several factors as can be appreciated by those skilled in the art, and as defined by the requirements of applicable standards and specification. In general, curable composition provided by the present disclosure develop adhesion strength within 24 hours to 30 hours, and 90% of full adhesion strength develops from about 2 days to about 3 days, following application to a surface. In general, full adhesion strength as well as other properties of cured compositions provide by the present disclosure become fully developed within 7 days following mixing and application of a curable composition to a surface.

Cured compositions such as cured sealants exhibit properties acceptable for use in aerospace applications.

In certain embodiments, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, §3.1.1 etc., available from SAE (Society of Automotive Engineers)).

In certain embodiments, compositions provide a cured product, such as a sealant, exhibiting a tensile elongation of at least 100% and a tensile strength of at least 400 psi when measured in accordance with the procedure described in AMS 3279, §3.3.17.1, test procedure AS5127/1, §7.7.

In certain embodiments, compositions provide a cured product, such as a sealant, that exhibits a lap shear strength of greater than 200 psi and in some cases at least 400 psi when measured according to the procedure described in SAE AS5127/1 paragraph 7.8.

In certain embodiments, a cured sealant comprising a composition provided by the present disclosure meets or exceeds the requirements for aerospace sealants as set forth in AMS 3277.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a method for sealing an aperture comprises (a) applying a sealant composition provided by the present disclosure to one or more surfaces defining an aperture, (b) assembling the surfaces defining the aperture, and (c) curing the sealant, to provide a sealed aperture.

In certain embodiments, a composition may be cured under ambient conditions, where ambient conditions refers to a temperature from 20° C. to 25° C., and atmospheric humidity. In certain embodiments, a composition may be cured under conditions encompassing a temperature from a 0° C. to 100° C. and humidity from 0% RH to 100% RH. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation such as ultraviolet radiation. As will also be appreciated, the methods may be used to seal apertures on aerospace vehicles including aircraft and aerospace vehicles.

Apertures, including apertures of aerospace vehicles, sealed with compositions provided by the present disclosure are also disclosed.

EXAMPLES

Embodiments provided by the present disclosure are further illustrated by reference to the following examples, which describe the synthesis, preparation, properties, and uses of certain moisture-curable, amine-catalyzed compositions. It will be apparent to those skilled in the art that many modifications, both to materials, and methods, may be practiced without departing from the scope of the disclosure.

Example 1

Comparative Composition 1

The components were mixed in a plastic container with lid. Divinyl sulfone (0.61 g, available from Aldrich) and Permapol® P3.1E (16 g, a thiol-terminated polythioether polymer, available from PRC-Desoto International Inc., Sylmar, Calif.) were added to the container. The container was placed in a speed mixer (DAC 600 FVZ) and mixed for 60 seconds at 2,300 rpm. After 3 weeks exposure to ambient conditions, the mixture remained liquid and no curing was observed.

Example 2

Comparative Composition 2

The components were mixed in a plastic container with lid. Divinyl sulfone (0.61 g, available from Aldrich) and Permapol® P3.1E (16 g, a thiol-terminated polythioether polymer, available from PRC-Desoto International Inc., Sylmar, Calif.), and Vestamin® A139 (0.17 g, a moisture-activated amine, available from Evonik Degussa Corp.) were added to the container. The container was placed in a speed mixer (DAC 600 FVZ) and mixed for 60 seconds at 2,300 rpm. The mixed material was kept inside the covered plastic container for 7 days at room temperature. After 7 days, the material had completely cured to a solid elastomer.

Example 3

Comparative Composition 3

The components were mixed in a plastic container with lid. Divinyl sulfone (0.61 g, available from Aldrich) and Permapol® P3.1E (16 g, a thiol-terminated polythioether polymer, available from PRC-Desoto International Inc., Sylmar, Calif.), and KBE-9103 (0.17 g, a blocked aminosilane (3-triethoxy-N-(1,3-dimenthyl-butyliden) propylamine), available from Shin-Etsu of America, Inc, Akron, Ohio) were added to the container. The container was placed in a speed mixer (DAC 600 FVZ) and mixed for 60 seconds at 2,300 rpm. The mixed material was kept inside the covered plastic container for 7 days at room temperature. After 7 days, the material had completely cured to a solid elastomer.

Example 4

Comparative Composition 4

The components were mixed in a plastic container with lid. Divinyl sulfone (0.61 g, available from Aldrich) and Permapol® P3.1E (16 g, a thiol-terminated polythioether polymer, available from PRC-Desoto International Inc., Sylmar, Calif.), and Incozol® LV (0.17 g, a blocked amine (oxazolidine), available from Incorez Ltd.) were added to the container. The container was placed in a speed mixer (DAC 600 FVZ) and mixed for 60 seconds at 2,300 rpm. The mixed material was kept inside the covered plastic container for 7 days at room temperature. After 7 days, the material had completely cured to a solid elastomer.

Example 5

Synthesis of Silyl-Blocked Polythioether Polymer 1402 g of Permapol® P3.1E (a mercaptan-terminated polythioether polymer, available from PRC-Desoto International Inc., Sylmar, Calif.), 511.85 mL of toluene, and 152.35 g of triethylamine were added to a 2-liter, 3-necked, round-bottom flask, fitted with a thermocouple and addition funnel. The reaction mixture was stirred for approximately 30 minutes, or it was visibly emulsified. 166.86 g of triethylchlorosilane was added to an addition funnel and slowly added to the reaction mixture drop-wise at room temperature over the course of 30 minutes, making sure the temperature never went above 30° C. After complete addition of triethylchlorosilane, the reaction was allowed to stir for 2-16 hours. After this, the reaction mixture was diluted with toluene, filtered over a coarse, fritted funnel, and stored in a moisture-proof container to provide a silyl-blocked polythioether polymer.

Example 6

Composition 1

The components were mixed in a plastic container with lid. Divinyl sulfone (0.61 g, available from Aldrich) and a silyl-blocked polythioether prepolymer (24.39 g, synthesized according to Example 5), and Vestamin® A139 (0.50 g, a moisture-activated amine, available from Evonik Degussa Corp.) were added to the container. The container was placed in a speed mixer (DAC 600 FVZ) and mixed for 60 seconds at 2,300 rpm. The mixed material was cured for 2 weeks at ambient conditions at which time the material had completely cured to a solid elastomer.

Another portion of mixed material was kept inside the container, without exposing to ambient moisture. After 3 weeks, the mixed material remained liquid.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A moisture-curable composition comprising:

(a) a trialkylsilane-terminated sulfur-containing polymer, comprising a trialkylsilane-terminated polythioether comprising:

(A) a backbone comprising a structure having the Formula (1):

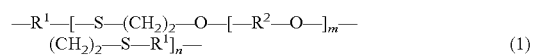

$$-R^1-[-S-(CH_2)_2-O-[-R^2-O-]_m-(CH_2)_2-S-R^1]_n- \quad (1)$$

wherein:

(i) each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a $-[(-CH_2-)_p-X-]_q-(CH_2)_r-$ group, and a $-[(-CH_2-)_p-X-]_q-(CH_2)_r-$ group in which at least one $-CH_2-$ unit is substituted with a methyl group;

(ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a $-[(-CH_2-)_p-X-]_q-(CH_2)_r-$ group;

(iii) each X is independently selected from $-O-$, $-S-$, and a $-NR^6-$ group, in which $R^6$ is selected from hydrogen and a methyl group;

(iv) m ranges from 0 to 50;

(v) n is an integer ranging from 1 to 60;

(vi) p is an integer ranging from 2 to 6;

(vii) q is an integer ranging from 1 to 5; and (viii) r is an integer ranging from 2 to 10; and (B) at least two groups, per molecule, of Formula (2):

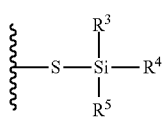
(2)

wherein $R^3$, $R^4$, and $R^5$ are each independently selected from a $C_{1-6}$ n-alkyl group, a $C_{3-6}$ branched alkyl group, a substituted $C_{1-6}$ n-alkyl group, and a phenyl group; and
(b) a curing agent; and
(c) a blocked basic catalyst.

2. The composition of claim 1, wherein the trialkylsilane-terminated sulfur-containing polymer comprises a polysulfide.

3. The composition of claim 1, wherein the trialkylsilane-terminated polythioether comprises a trialkylsilane-terminated polythioether of Formula (3), a trialkylsilane-terminated polythioether adduct of Formula (3a), or a combination thereof:

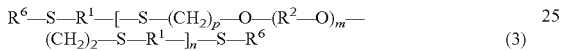
(3)

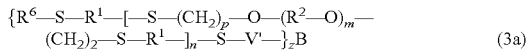
(3a)

wherein:
each $R^1$ independently is selected from $C_{2-6}$ alkanediyl, $C_{6-8}$ cycloalkanediyl, $C_{6-10}$ alkanecycloalkanediyl, $C_{5-8}$ heterocycloalkanediyl, and —[(—$CHR^3$—)$_s$—X—]$_q$—(—$CHR^3$—)$_r$—; wherein:
s is an integer from 2 to 6;
q is an integer from 1 to 5;
r is an integer from 2 to 10;
each $R^3$ is independently selected from hydrogen and methyl; and
each X is independently selected from —O—, —S—, and —NHR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(—$CHR^3$—)$_s$—X—]$_q$—(—$CHR^3$—)$_r$—, wherein s, q, r, $R^3$, and X are as defined above;
m is an integer from 0 to 50;
n is an integer from 1 to 60;
p is an integer from 2 to 6;
B represents a core of a z-valent, alkenyl-terminated polyfunctionalizing agent B(—V)$_z$ wherein:
z is an integer from 3 to 6; and
each —V is a group comprising a terminal alkenyl group; and
each —V'— is derived from the reaction of —V with a thiol; and
each $R^6$ is independently a moiety comprising a terminal group of Formula (2),

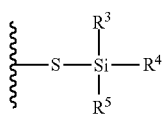
(2)

wherein $R^3$, $R^4$, and $R^5$ are each independently selected from a $C_{1-6}$ n-alkyl group, a $C_{3-6}$ branched alkyl group, a substituted $C_{1-6}$ n-alkyl group, and a phenyl group.

4. The composition of claim 1, wherein the trialkylsilane-terminated polythioether comprises the reaction product of reactants comprising:
(a) a polythioether is selected from a thiol-terminated polythioether of Formula (8), a thiol-terminated polythioether of Formula (8a), and a combination thereof:

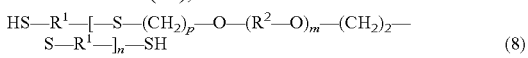
(8)

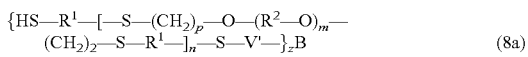
(8a)

wherein:
each $R^1$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and —[(—$CHR^3$—)$_s$—X—]$_q$—(—$CHR^3$—)$_r$—; wherein:
s is an integer from 2 to 6;
q is an integer from 1 to 5;
r is an integer from 2 to 10;
each $R^3$ is independently selected from hydrogen and methyl; and
each X is independently selected from —O—, —S—, and —NHR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(—$CHR^3$—)$_s$—X—]$_q$—(—$CHR^3$—)$_r$—, wherein s, q, r, $R^3$, and X are as defined above;
m is an integer from 0 to 50;
n is an integer from 1 to 60;
p is an integer from 2 to 6;
B represents a core of a z-valent, alkenyl-terminated polyfunctionalizing agent B(—V)$_z$ wherein:
z is an integer from 3 to 6; and
each —V is a group comprising a terminal alkenyl group; and
each —V'— is derived from the reaction of —V with a thiol; and
(b) a halosilane of Formula (9):

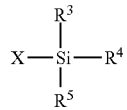
(9)

wherein:
X is halogen; and
$R^3$, $R^4$, and $R^5$ are each independently selected from a $C_{1-6}$ n-alkyl group, a $C_{3-6}$ branched alkyl group, a substituted $C_{1-6}$ n-alkyl group, and a phenyl group.

5. The composition of claim 4, wherein z is 3 and the polyfunctionalizing agent is a trifunctionalizing agent.

6. The composition of claim 1, wherein the curing agent is selected from a polyepoxide, a compound having at least two terminal Michael acceptor groups, and a combination thereof.

7. The composition of claim 6, wherein the compound comprising at least two terminal Michael acceptor groups comprises divinyl sulfone.

8. The composition of claim 6, wherein the compound having at least two terminal Michael acceptor groups comprises a sulfur-containing adduct.

9. The composition of claim 8, wherein the sulfur-containing adduct is selected from a sulfur-containing adduct of Formula (11), a sulfur-containing adduct of Formula (11a), and a combination thereof:

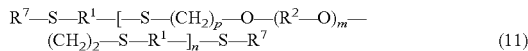
(11)

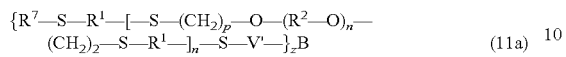
(11a)

wherein:
each $R^1$ independently is selected from $C_{2-6}$ alkanediyl, $C_{6-8}$ cycloalkanediyl, $C_{6-10}$ alkanecycloalkanediyl, $C_{5-8}$ heterocycloalkanediyl, and $—[(—CHR^3—)_s—X—]_q—(—CHR^3—)_r—$; wherein:
s is an integer from 2 to 6;
q is an integer from 1 to 5;
r is an integer from 2 to 10;
each $R^3$ is independently selected from hydrogen and methyl; and
each X is independently selected from —O—, —S—, and —NHR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined above;
m is an integer from 0 to 50;
n is an integer from 1 to 60;
p is an integer from 2 to 6;
B represents a core of a z-valent, alkenyl-terminated polyfunctionalizing agent $B(—V)_z$ wherein:
z is an integer from 3 to 6; and
each —V is a group comprising a terminal alkenyl group; and
each —V'— is derived from the reaction of —V with a thiol; and
each $R^7$ is independently a moiety comprising a terminal Michael acceptor group.

10. The composition of claim 9, wherein each terminal Michael acceptor group is blocked with a trialkylsilane group.

11. The composition of claim 1, wherein the curing agent is characterized by an average functionality from 2 to 3.

12. The composition of claim 1, comprising a basic oxide.

13. The composition of claim 1, wherein the blocked base catalyst comprises a blocked amine catalyst.

14. The composition of claim 13, wherein the blocked amine catalyst is selected from a ketimine, an enamine, an oxazolidine, an aldimine, and an imidazolidine.

15. A moisture-curable composition comprising:
(a) a trialkylsilane-terminated sulfur-containing polymer, comprising a trialkylsilane-terminated polythioether comprising:

(A) a backbone comprising a structure having the Formula (1):

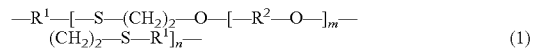
(1)

wherein:
(i) each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a $—[(—CH_2—)_p—X—]_q—(CH_2)_r—$ group, and a $—[(—CH_2—)_p—X—]_q—(CH_2)_r—$ group in which at least one —$CH_2$— unit is substituted with a methyl group;
(ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a $—[(—CH_2—)_p—X—]_q—(CH_2)_r—$ group;
(iii) each X is independently selected from —O—, —S—, and a —$NR^6$— group, in which $R^6$ is selected from hydrogen and a methyl group;
(iv) m ranges from 0 to 50;
(v) n is an integer ranging from 1 to 60;
(vi) p is an integer ranging from 2 to 6;
(vii) q is an integer ranging from 1 to 5; and
(viii) r is an integer ranging from 2 to 10; and
(B) at least two groups, per molecule, of Formula (2):

(2)

wherein $R^3$, $R^4$, and $R^5$ are each independently selected from a $C_{1-6}$ n-alkyl group, a $C_{3-6}$ branched alkyl group, a substituted $C_{1-6}$ n-alkyl group, and a phenyl group; and
(b) divinyl sulfone; and
(c) a moisture-activated amine catalyst.

16. An aperture sealed with the composition of any one of claims 1 and 15.

17. A method of sealing an aperture comprising:
(a) applying the composition of any one of claims 1 or 15 to at least one surface defining an aperture;
(b) assembling the surfaces defining the aperture; and
(c) curing the sealant to provide a sealed aperture.

18. The composition of claim 1, wherein the polythioether is characterized by an average functionality from 2.1 to 2.8.

19. The composition of claim 1, wherein,
$R^1$ is $—[(—CH_2—)_p—X—]_q—(CH_2)_r—$ wherein X is O;
each $R^2$ is a $C_{2-10}$ n-alkanediyl group; and
m ranges from 1 to 4.

20. The composition of claim 1, formulated as a sealant.

21. A surface sealed with the composition of claim 20.

* * * * *